United States Patent [19]

Tombs et al.

[11] Patent Number: 4,763,599
[45] Date of Patent: Aug. 16, 1988

[54] SOLDERING APPARATUS

[75] Inventors: Michael Tombs; Alexander J. Ciniglio, both of Essex, Great Britain

[73] Assignee: Pillarhouse International Limited, Great Britain

[21] Appl. No.: 18,518

[22] Filed: Feb. 25, 1987

[30] Foreign Application Priority Data

Feb. 25, 1986 [GB] United Kingdom ............... 8604559
Aug. 22, 1986 [GB] United Kingdom ............... 8620442

[51] Int. Cl.⁴ ............................................. B05C 11/00
[52] U.S. Cl. .................................... 118/57; 118/425; 427/123; 427/347
[58] Field of Search ............... 427/123, 347; 118/500, 118/503, 74, 57, 425

[56] References Cited

U.S. PATENT DOCUMENTS

| | | | |
|---|---|---|---|
| 1,472,228 | 10/1923 | Peirce | 427/347 |
| 2,723,922 | 11/1955 | Fleming | 427/123 |
| 2,856,893 | 10/1958 | Harris | 118/503 |
| 3,359,132 | 12/1967 | Wittmann | 427/347 |
| 3,713,876 | 1/1973 | Lavric | 427/123 |
| 3,982,047 | 9/1976 | Braden | 427/123 |
| 4,210,095 | 7/1980 | Rouquié | 427/347 |
| 4,501,770 | 2/1985 | Bajka et al. | 427/347 |

Primary Examiner—Thurman K. Page
Assistant Examiner—L. R. Horne
Attorney, Agent, or Firm—Wigman & Cohen

[57] ABSTRACT

A soldering apparatus includes a solder bath 40 and a component holder 43 positioned to lower an exposed tag of a component to contact solder in the solder bath 40. After removal from the bath the component is deliberately subjected to a mechanical shock when a limb of a bracket 44 strikes a turret plate 42 under the action of a spring 46. The shock causes a short time vibration in the component and spreads solder in tears which naturally form on the exposed tags to remove or substantially reduce those tears.

10 Claims, 3 Drawing Sheets

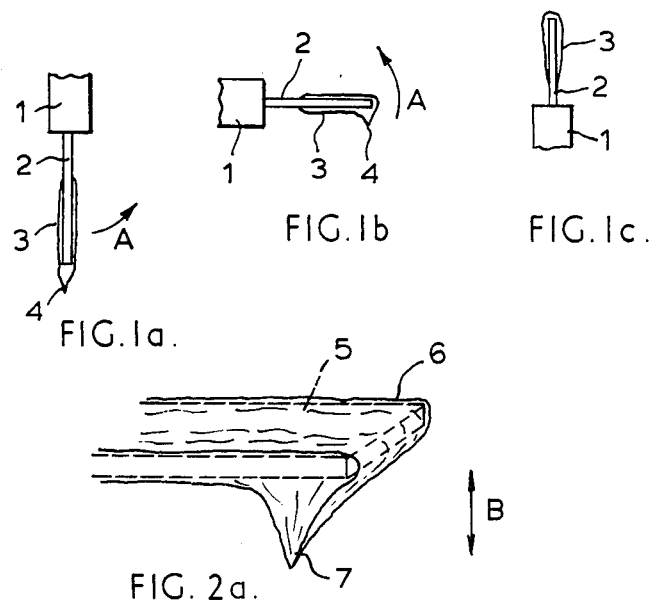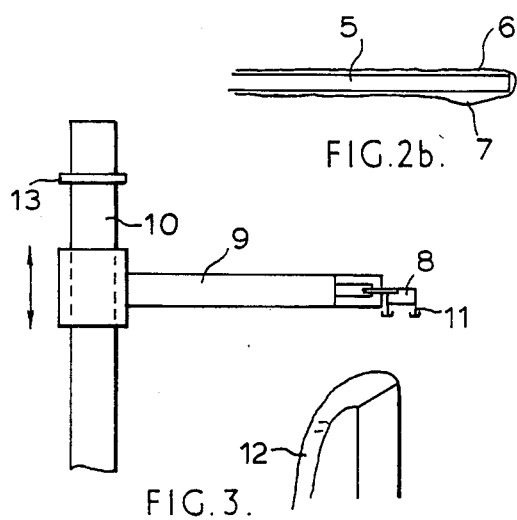

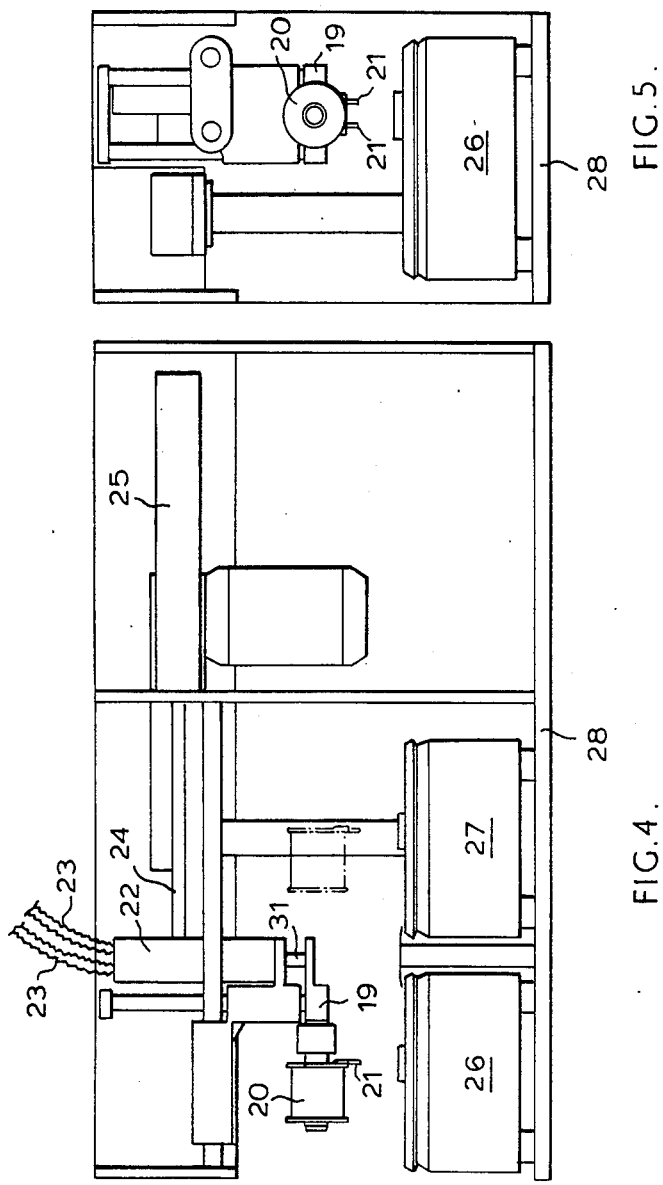

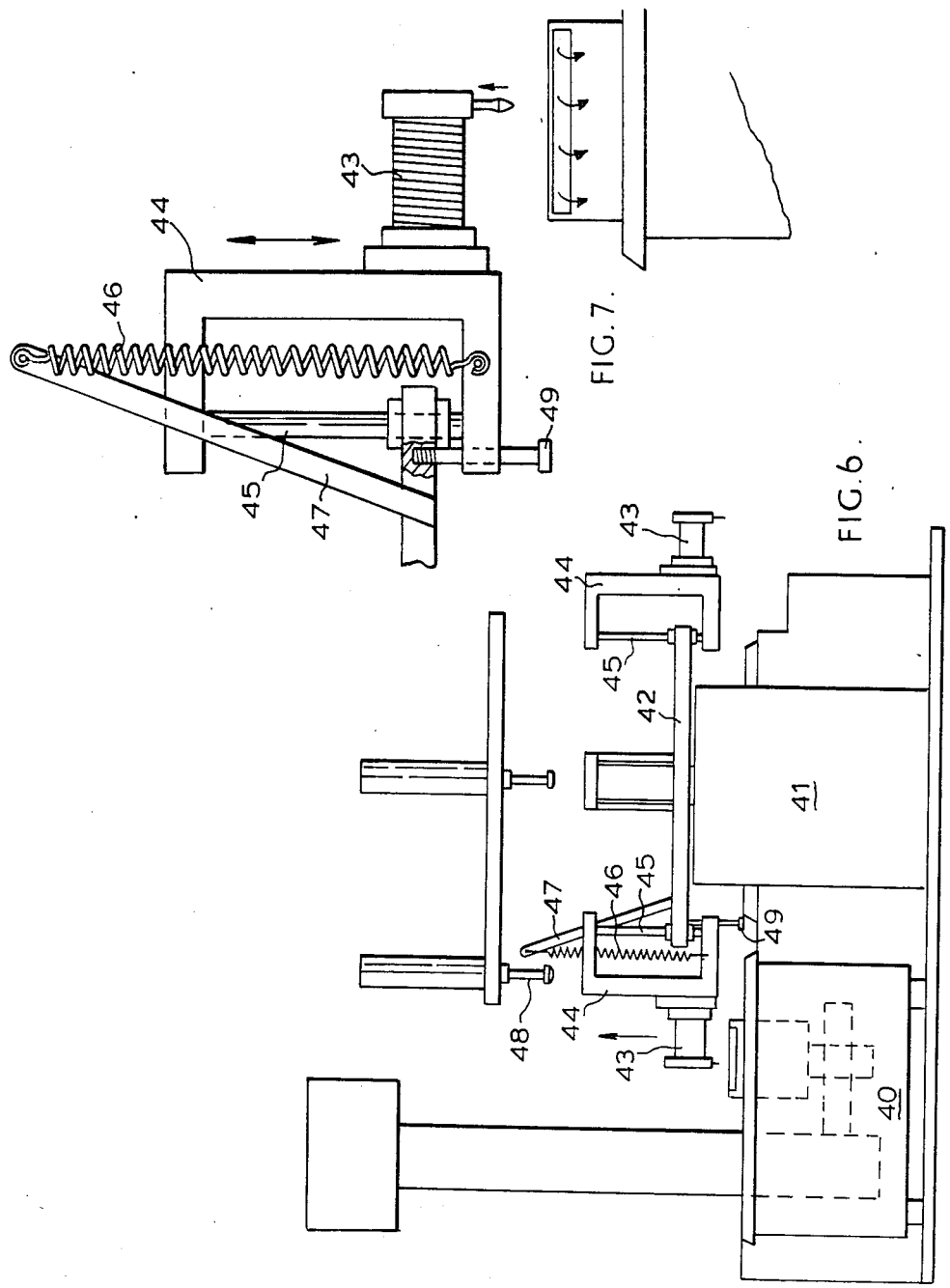

SOLDERING APPARATUS

The invention relates to soldering apparatus.

The invention relates more particularly to soldering of individual components as required in an assembly line for example. When a component tag or lead is tinned by dipping the lead into a bath or stream of solder and then removing the lead, a tear or spike of solder is formed at the end of the lead. This tear makes it difficult or impossible to insert the lead into a printed circuit board. Similarly, tears are formed in soldering operations when tags or leads to be soldered together are immersed in a bath of solder and then removed. The solder may of course be in a stream above the bath and the tag inserted into the stream. Such tears may not only cause difficulty in inserting the soldered components into a printed circuit board but may also cause short circuiting between components.

According to one aspect of the invention there is provided a method of removing or reducing a solder tear formed on a tag or lead of a component during soldering, the method comprising vibrating the component at least to some extent after removal from a bath of solder such as to spread solder in the tear formed during removal along the tag or lead.

A preferred method of the invention includes giving the component, or at least the soldered tag or lead, a mechanical vibratory shock.

According to another aspect of the invention there is provided a soldering apparatus for soldering one or more tags or leads of a component by immersion thereof into molten solder, the apparatus having a component holder mountable above a solder bath, means for moving the holder towards and away from the bath to immerse the tags or leads into the molten solder in use, including a device to apply a vibration to the component holder when the component holder has moved away from the bath and so cause spreading of the solder in tears formed during removal of the tags or leads.

The apparatus may comprise a movable component holder mounted for cyclic and generally linear movement above and between a flux bath and a solder bath, means arranged to lower the component holder from a loading and unloading station above the flux bath towards the flux bath to contact the component with flux and then to raise the component holder after fluxing, to move the component holder to above the solder bath, to lower the component holder to contact the component with solder, and to return it to the loading and unloading station after the component holder has been raised up from the bath to complete a cycle, including means for moving the component holder rapidly upwards from the solder bath, and a stop against which the holder strikes to cause it to vibrate at least to some extent.

The apparatus may be arranged to move the component holder away from above the flux bath in a directon away from the solder bath to provide a loading and unloading station away from the flux bath and solder bath.

The apparatus may comprise a movable component holder mounted for cyclic movement to apply solder to exposed component tags or leads from a solder bath, means arranged to lower the component holder from a loading and unloading station above the solder bath to contact the component with solder, and to return it to the loading and unloading station to complete a cycle, including means for moving the component holder rapidly upwards from the solder bath, and a stop against which the holder strikes to cause it to vibrate at least to some extent.

This has the effect of reducing any tears formed by the application of the solder to the component tag or lead. Preferably the force of any shocks act along the principal axial direction of the tear. This has been found to spread the tear along the tag or lead. The shock or shocks may be produced by moving the component or its holder against a resilient or somewhat resilient stop to decelerate the component rapidly, but in some circumstances the component holder may be struck sharply, e.g. with a hammer or contacted with a vibrator tool.

The shock and/or vibration is preferably or generally applied immediately after the tag or lead is removed from the solder bath or stream.

Where a sharp mechanical shock, in particular, is applied, this may be sufficient to throw a drop of solder off the tag or lead. This may be beneficial, however care must be taken to ensure that too much solder is not lost in this way, as it may lead to a dry joint being formed.

Embodiments of the invention will now be described by way of example, with reference to the accompanying drawings, in which:

FIGS. 1a, 1b and 1c, illustrate a first embodiment of the invention;

FIGS. 2a and 2b are perspective and side views illustrating the reduction of a tear on a soldered tag;

FIG. 3 illustrates a second embodiment of the invention;

FIG. 4 is a side elevation of a further embodiment of the invention;

FIG. 5 is an end view of the further embodiment;

FIG. 6 is a side elevation of another embodiment of the invention; and

FIG. 7 is a side elevation of part of the other embodiment enlarged in scale

Referring to FIG. 1a, a component such as a resistor 1 has a lead 2 which is dipped vertically into a bath of solder and then removed. The lead 2 is tinned with a thin layer of solder and normally has a tear 4 of solder at its lower end. In FIG. 1b the component lead 2 has been removed horizontally from within a stream of solder, the tear 4 being formed at the end of the lead 2 as it is removed from the stream. In both the FIG. 1a and FIG. 1b examples, the component is rotated in the direction of arrow A immediately after removal from the bath or stream so that the lead 2 projects vertically upwards and the holder or its support (not shown) given a sharp blow with a hammer. As a result the solder of the tear spreads and eliminates the tear configuration.

FIG. 2a shows a tag 5 having a coating 6 of solder. A large tear 7 is formed on the end of the tag 5. The tear points vertically down. The tag is vibrated in the axial direction of the tear 7, arrow B, whilst the solder in the tag remans fluid, causing the solder in the tear 7 to flow along the tag, reducing the size of the tear, FIG. 2b. The solder will usually flow over the region of the tag which already has a coating of solder on it.

The tag may be vibrated by holding the component on a resiliently mounted arm and striking the arm. In some cases the tag, or the mounting arm, may be sufficiently resilient to vibrate at least to some extent after being given a single blow.

FIG. 3 shows a system in which a component 8 is mounted in an arm 9 which is slid vertically on a shaft 10. The arm 9 is lowered to dip legs 11 of the component 8 into a solder stream 12 to solder or tin them, and the arm 9 is then slid vertically, arrow C, until the arm 9 strikes a stop 13 on the shaft 10 rapidly decelerating and vibrating the component 8 and causing solder in the tears on the legs 11 to spread up the legs.

In another embodiment (not shown) the arm may be slid downwardly under gravity against a stop.

It is particularly advantageous if the shock or vibration is directed along the principal axial direction of the tear, which is usually vertical unless the component is rotated after removal from the bath or stream.

In FIGS. 4 and 5, the soldering apparatus includes a component holder 19 in the form of a jawed vice for receiving and holding a component having exposed base tags 21 to be soldered. The holder 19 releasable fits onto a shaft 31 and can be replaced by other holders designed and shaped to receive and hold other forms or shaped components. The shaft 31 is the piston of a pneumatically operated positioning device 22 supplied with air along two flexible lines 23. The device 22 is supported by a further shaft or piston 24 movable horizontally and part of a pneumaticlly controlled positioning device 25. A flux bath 26 and a solder bath 27 are positioned and supported on a frame member 28 of the apparatus. Various position sensors (not shown) and a central programming module (not shown) form part of the apparatus to control the operation and movement of the holder 19.

In use, the component 20 is placed in the holder 19 when the holder is in a loading station, as shown in FIG. 4. The piston 31 is then actuated to move the holder 19 downwards so that the exposed tags 21 move into contact with the flux in the bath 26. The holder 19 is then raised by the piston 31. Positioning device 25 is now activated to move the holder 19 to above the solder bath 27 where the piston 31 is activated to lower the component holder 19 so as to contact the tags with the solder in the bath 27. The holder 19 is then moved by the piston 31 upwards, the piston 24 is driven to move the holder 19 to the position shown in FIG. 4, to complete a cycle, where the component is manually removed.

In correspondence with the description relating to FIGS. 1 to 3, the apparatus of FIGS. 4 and 5 is arranged to move the holder 19 upwards from above the solder bath 27 in a particular manner. The holder 19 is moved quickly upwards and arrested against a stop (not shown) which is itself somewhat resilient or mounted somewhat resiliently. As a result the holder 19 decelerates rapidly and vibrates at least a few cycles over a small distance which causes any tear formed to flow along the tag. In this way the tag is considerably diminished in its lateral dimension than otherwise and solder moved upwards towards the base of the component body. A tag for example soldered using the described apparatus can then readily fit into a conventional aperture on a printed circuit board. Also lateral touching, causing electrical shorting in use, is illiminated because the lateral extension of the tears is reduced to increase the effective lateral separation of any adjacent soldered tags on the base of the component.

Various mechanical arrangements for achieving the movement of the holder 19 are possible. It will be noted however that one way of arranging the rapid deceleration of the holder 19 referred to is to remove the conventional air-cushion in a pneumatically operated positioning device or mounting the holder 19 on the piston 21 via a somewhat resilient bearing or via other somewhat resilient couplings.

In FIGS. 6 and 7, a solder bath 40 is positioned at the side of a turret 41 having a circular turret plate 42. A number of like component holders 43 are positioned around the plate 42. Each holder 43 is supported by a U-shaped bracket 44 fixed to a shaft 45 which is slidably supported by the turret plate 42. Each holder has a spring 46 (only one is shown) connected between the lower limb of the bracket 44 and the top of an anchor arm 47 fitted to the turret plate 42.

In practice, when a holder is in position above the solder bath 40 (there may be two or more solder baths placed around the turret 41), a piston 48 is arranged to push against the top of the bracket 44 to lower the holder so that the component leads contact with the surface of the solder in the bath. An adjustable stop 49 is provided to limit the movement of the holder 43. The piston 48 is then withdrawn and the holder 43 is accelerated upwards by the spring 46. When the lower arm of the bracket 44 strikes the turret plate 42, the holder 43 is rapidly decelerated and vibrated to some extent. As a result solder in the tear spreads out as explained earlier, to reduce or eliminate tears on the leads.

In normal use, after each soldering operation, the turret 41 is indexed to move the component holders round and away the solder bath so that the soldered component can be readily removed and another component fitted into the holder.

In an alternative arrangement of the embodiment in FIGS. 6 and 7, a vibrator tool is provided which contacts the holders 34 as soon as they move upwards from the solder bath 40. The vibrator tool is selectively positioned to come automatically into contact with the component holder as it moves upwards from the or one of the solder baths. Normally, the tool vibrates the holder for only about half a second but longer periods can be used.

As explained earlier, and in each embodiment of the invention, the tears are removed or virtually removed by vibrating the component after the leads of the components are removed from contact with molten solder. In practice, it has been found that a couple of cycles of vibration is often sufficient to achieve the required result of spreading the solder to remove the tear. Futher, although a vibrator tool can be used, it is usually sufficient to simply impact the holder or to drive the holder or its support against a stop. Even when the support and stop are made of "non-resilient" material, a vibration is invariably set up, albeit of maybe only two or three cycles, due to the natural or inherent resilience of all mechanical structures. In other words, the vibration as such does not have to be positively designed into the mechanism, simply by providing any mechanical impact in the relative movement of the holder, sufficient vibration will occur in any mechanism in practice. As a result, once the present invention has to provide removal or virtual removal of tears, it is a relative simple matter in practice to design suitable machines to achieve the desired results.

What is claimed is:

1. A soldering apparatus for soldering one or more tags or leads of a component by immersion thereof into moulten solder, the apparatus having a component holder mountable above a solder bath, means for moving the holder towards and away from the bath to immerse the tags or leads into the moulten solder in use, including a device to rapidly decelerate the component holder when the component holder has moved away from the bath and so cause spreading of the solder tears formed during removal of the tags or leads from the moulten solder.

2. A soldering apparatus according to claim 1, in which the device comprises a stop and a spring resiliently biased to move the component holder away from the solder bath to strike against the stop so that the component holder rapidly decelerates.

3. A soldering apparatus according to claim 2, including a resilient pad which fits between the stop and the component holder.

4. A soldering apparatus according to claim 1, in which the device comprises a vibrating tool selectively positioned to mechanically contact the component holder and to vibrate it.

5. A soldering apparatus comprising a movable component holder mounted for cyclic and generally linear movement above and between a flux bath and a solder bath, means arranged to lower the component holder from a loading and unloading station above the flux bath towards the flux bath to contact the component with flux and then to raise the component holder after fluxing, to move the component holder to above the solder bath, to lower the component holder to contact the component with moulten solder, and to return it to the loading and unloading station after the component holder has been raised up from the bath to complete a cycle, including means for moving the component holder rapidly upwards from the solder bath, and a stop against which the holder strikes to cause it to rapidly decelerate and cause spreading of solder tears formed during removal of the component from the moulten solder.

6. A soldering apparatus according to claim 5, including means to move the component holder away from above the flux bath in a direction away from the solder bath to provide a loading and unloading station away from both the flux bath and solder bath.

7. A soldering apparatus comprising a movable component holder mounted for cyclic movement to apply solder to exposed component tags or leads from a solder bath, means arranged to lower the component holder from a loading and unloading station above the solder bath to contact the component with solder, and to return it to the loading and unloading station to complete a cycle, including means for moving the component holder rapidly upwards from the solder bath, and a stop against which the holder strikes to cause it to rapidly decelerate and to cause spreading of solder tears formed during removal of the tags or leads from the solder bath.

8. A soldering apparatus according to claim 7, including a rotary turret, having two or more component holders, arranged to move the component holders in turn to above the solder bath to begin each cycle and away from above the solder bath after the end of each cycle.

9. A method of removing or reducing a solder tear formed on a tag or lead of a component during soldering, the method comprising dipping the tag or lead into a moulten solder bath, moving the component away from the solder bath, and rapidly decelerating the component such as to spread solder in the tear formed during removal along the tag or lead.

10. A method according to claim 9, including holding the component in a component holder and rapidly decelerating movement of the holder by causing the holder to strike against a stop positioned in its path of movement away from the solder bath after removal from the solder bath.

* * * * *